United States Patent
Yeh et al.

(10) Patent No.: US 12,318,920 B2
(45) Date of Patent: Jun. 3, 2025

(54) SAFETY SYSTEM, JOINT ASSEMBLY WITH SAFETY SYSTEM, AND ROBOT HAVING JOINT ASSEMBLY

(71) Applicants: SHANGHAI FLEXIV ROBOTICS TECHNOLOGY CO., LTD., Shanghai (CN); FLEXIV LTD., Cayman Islands (GB)

(72) Inventors: Xiyang Yeh, Shanghai (CN); Chenghao Wang, Santa Clara, CA (US); Peizhang Zhu, Shanghai (CN)

(73) Assignees: SHANGHAI FLEXIV ROBOTICS TECHNOLOGY CO., LTD., Shanghai (CN); FLEXIV LTD., Grand Cayman (GB)

( * ) Notice: Subject to any disclaimer, the term of this patent is extended or adjusted under 35 U.S.C. 154(b) by 0 days.

(21) Appl. No.: 17/997,256

(22) PCT Filed: Oct. 12, 2021

(86) PCT No.: PCT/CN2021/123217
§ 371 (c)(1),
(2) Date: Oct. 27, 2022

(87) PCT Pub. No.: WO2023/060423
PCT Pub. Date: Apr. 20, 2023

(65) Prior Publication Data
US 2024/0217124 A1 Jul. 4, 2024

(51) Int. Cl.
*B25J 19/00* (2006.01)
*B25J 9/16* (2006.01)
(Continued)

(52) U.S. Cl.
CPC ......... *B25J 19/0004* (2013.01); *B25J 9/1674* (2013.01); *B25J 13/085* (2013.01);
(Continued)

(58) Field of Classification Search
None
See application file for complete search history.

(56) References Cited

U.S. PATENT DOCUMENTS

| | | | |
|---|---|---|---|
| 2015/0328774 A1* | 11/2015 | Yajima | B25J 9/1676 |
| | | | 702/183 |
| 2017/0057095 A1* | 3/2017 | Oestergaard | B25J 19/06 |
| (Continued) | | | |

FOREIGN PATENT DOCUMENTS

| | | |
|---|---|---|
| CN | 107645980 A | 1/2018 |
| CN | 108145716 A | 6/2018 |
| (Continued) | | |

OTHER PUBLICATIONS

International Search Report and Written Opinion from International Application No. PCT/CN2021/123217 mailed Jul. 15, 2022.
(Continued)

*Primary Examiner* — Kyle T Johnson
*Assistant Examiner* — Arslan Azhar
(74) *Attorney, Agent, or Firm* — Dorsey & Whitney LLP

(57) ABSTRACT

A safety system of a joint assembly which includes a motor and a brake coupled to the motor is provided. The safety system includes at least one set of sensors configured to detect at least one parameter associated with safety function of the joint assembly, a driving circuit coupled to the motor and the brake and arranged within the joint assembly; and a first processor and a second processor arranged within the joint assembly. The first processor and the second processor configured to receive a signal indicative of the at least one parameter from the at least one set of sensors and send a stop command directly to the driving circuit to stop the motor in response to a joint fault determined based on the signal received from the at least one set of sensors.

19 Claims, 3 Drawing Sheets

(51) Int. Cl.
    *B25J 13/08*     (2006.01)
    *B25J 17/00*     (2006.01)
    *B25J 19/06*     (2006.01)

(52) U.S. Cl.
    CPC ............ *B25J 13/088* (2013.01); *B25J 17/00* (2013.01); *B25J 19/06* (2013.01)

(56) References Cited

U.S. PATENT DOCUMENTS

| | | | |
|---|---|---|---|
| 2018/0169864 A1* | 6/2018 | Haddadin | G05B 9/03 |
| 2018/0194009 A1* | 7/2018 | Kojima | B25J 9/0018 |
| 2019/0183501 A1* | 6/2019 | Shelton, IV | A61B 17/07207 |
| 2020/0038121 A1* | 2/2020 | Yang | A61B 90/06 |

FOREIGN PATENT DOCUMENTS

| | | | | |
|---|---|---|---|---|
| CN | 108247654 A | | 7/2018 | |
| CN | 109676635 A | | 4/2019 | |
| CN | 212660126 U | * | 3/2021 | |
| EP | 3628451 A1 | * | 4/2020 | ............ A61B 34/30 |
| JP | 2009202335 A | | 9/2009 | |
| JP | 2010287253 A | * | 12/2010 | |
| JP | 2017507041 A | | 3/2017 | |
| WO | 2015137040 A1 | | 9/2015 | |
| WO | 2019121794 A1 | | 6/2019 | |

OTHER PUBLICATIONS

Office Action for Japanese Application No. 2024-522266 mailed Mar. 18, 2025.

\* cited by examiner

SAFETY SYSTEM, JOINT ASSEMBLY WITH SAFETY SYSTEM, AND ROBOT HAVING JOINT ASSEMBLY

CROSS REFERENCE TO RELATED APPLICATIONS

This application is a U.S. National Stage of International Application No. PCT/CN2021/123217, filed on Oct. 12, 2021, the contents of which is incorporated herein by reference in its entirety.

TECHNICAL FIELD

The present disclosure relates to robot technology, particularly to a safety system, a joint assembly with the safety system, and a robot having the joint assembly.

BACKGROUND

Functional safety is a part of the overall safety of a system or piece of equipment that depends on automatic protection operating correctly in response to its inputs or failure in a predictable manner (fail-safe). The automatic protection system should be designed to properly handle likely human errors, hardware failures and operational and/or environmental stress. The objective of functional safety is freedom from unacceptable risk of physical injury or of damage to the health of people either directly or indirectly by the proper implementation of one or more automatic protection functions, namely safety functions. A safety system typically consists of one or more safety functions.

Safety functions are particularly important for robots. According to a conventional robot, the check and monitor work of all their safety functions needs to be done in their main safety controller located in a control box. The main safety controller needs to collect sensor data from all robot joints, and does all the related computation to determine whether there is any functional failure.

SUMMARY

One aspect of the present disclosure provides a safety system of a joint assembly which includes a motor and a brake coupled to the motor. The safety system includes at least one set of sensors configured to detect at least one parameter associated with safety function of the joint assembly, a driving circuit coupled to the motor and the brake and arranged within the joint assembly; and a first processor and a second processor arranged within the joint assembly. The first processor and the second processor configured to receive a signal indicative of the at least one parameter from the at least one set of sensors and send a stop command directly to the driving circuit to stop the motor in response to a joint fault determined based on the signal received from the at least one set of sensors.

Another aspect of the present disclosure provides a joint assembly with a safety system. The joint assembly includes a motor and a brake coupled to the motor. The safety system includes at least one set of sensors configured to detect at least one parameter associated with safety function of the joint assembly, a driving circuit coupled to the motor and the brake and arranged within the joint assembly; and a first processor and a second processor arranged within the joint assembly. The first processor and the second processor configured to receive a signal indicative of the at least one parameter from the at least one set of sensors and send a stop command directly to the driving circuit to stop the motor in response to a joint fault determined based on the signal received from the at least one set of sensors.

A yet another aspect of the present disclosure provides a robot having a joint assembly. The joint assembly includes a motor, a brake coupled to the motor, and a safety system. The safety system includes at least one set of sensors configured to detect at least one parameter associated with safety function of the joint assembly, a driving circuit coupled to the motor and the brake and arranged within the joint assembly; and a first processor and a second processor arranged within the joint assembly. The first processor and the second processor configured to receive a signal indicative of the at least one parameter from the at least one set of sensors and send a stop command directly to the driving circuit to stop the motor in response to a joint fault determined based on the signal received from the at least one set of sensors.

Details of one or more embodiments of the present disclosure are set forth in the accompanying drawings and description below. Other features, objects, and advantages of the disclosure will become apparent from the description, the drawings, and the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure.

DETAILED DESCRIPTION

Aspects and advantages of the invention will be set forth in part in the following description, or may be obvious from the description, or may be learned through practice of the invention.

Figure 1:
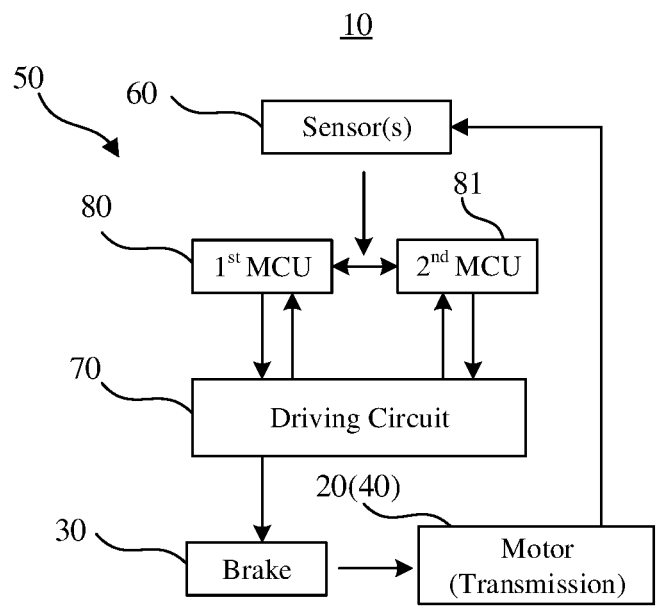
FIG. 1 is a schematic diagram of a joint assembly according to an embodiment of the present disclosure.

According to one aspect of the present disclosure, a safety system of a joint assembly is provided. In an embodiment as shown in FIG. 1, the joint assembly 10 includes a motor 20 and a brake 30 coupled to the motor 20 for stopping the same. Advantageously, a transmission 40, such as a reducer, is provided which changes the speed output and the torque output of the motor 20. The brake 30 may be coupled to the motor 20 directly, or indirectly by engaging with the transmission 40 coupled to the motor 20. Based on instructions of a processor or a controller, the brake 30 provides a braking force to the motor 20 or the transmission 40 such that the joint assembly 10 slows down or stops operating, thereby stopping the elements such as robot arms which are coupled to and driven by the joint assembly 10.

Continuing to refer to FIG. 1, a safety system 50 is provided to detect a joint failure for the joint assembly 10 and lock down the joint assembly 10 based on the detected joint failure. The safety system 50 includes at least one set of sensors 60 configured to detect at least one parameter associated with safety function of the joint assembly 10, a driving circuit 70 coupled to the motor 20 and the brake 30 and arranged within the joint assembly 10, and a first processor 80 and a second processor 81 arranged within the joint assembly 10. Specifically, the first processor 80 and the second processor 81 may be secured on a common circuit board or different circuit boards within the joint assembly 10 and are configured to receive a signal indicative of the at least one parameter from the at least one set of sensors 60 and send a stop command directly to the driving circuit 70 to stop the motor 20 in response to a joint failure determined based on the signal received from the at least one set of sensors 60. The joint failure may include, for example, a mechanical or functional fault of components of the joint assembly 10, or the physical connections or digital communication between the components.

In the exemplary examples shown in the figures, the first processor 80 and the second processor 81 may be implemented as a micro control unit (MCU).

Figure 2:
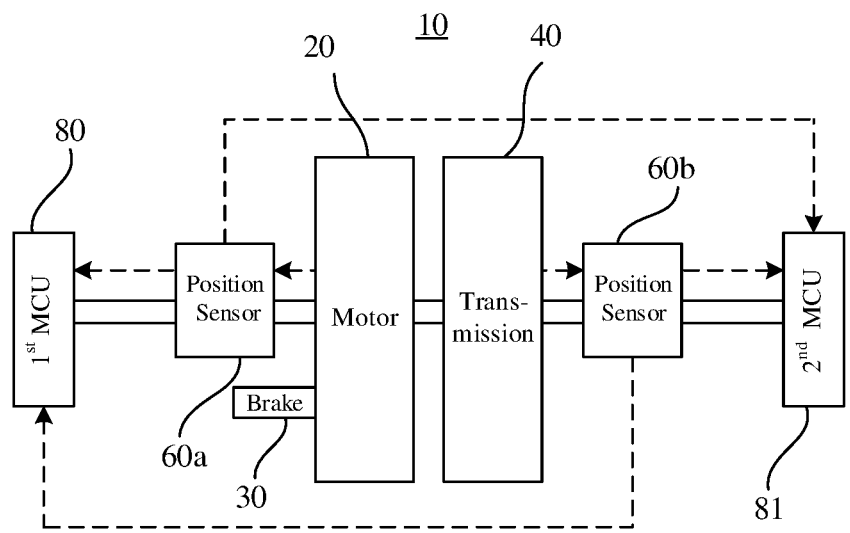
FIG. 2 is a schematic diagram of a structure of a joint assembly according to an embodiment of the present disclosure.

Referring to FIG. 2, in an embodiment, the at least one set of sensors 60 includes an input-side position sensor 60a configured to measure a position of a rotor of the motor 20 and an output-side position sensor 60b configured to measure a position of an output shaft of the transmission 40 coupled to the motor 20. At least one of the first processor 80 and the second processor 81 is configured to determine whether there is a joint failure based on the measured position of the rotor of the motor 20 and the measured position of the output shaft of the transmission 40. The position sensors 60a, 60b may include, for example, hall-effect position encoders.

For example, the first processor 80 obtains the measured position of the rotor of the motor 20 and the measured position of the output shaft of the transmission 40 by receiving signals from the position sensors 60a, 60b, respectively, and determines whether there is a joint failure based on the measured rotor position of the motor 20 and the measured output shaft position of the transmission 40. In a specific implementation, the first processor 80 compares the measured rotor position of the motor 20 with a predefined rotor position of the motor 20 to determine whether there is a joint failure. For example, it can be determined that there is a joint failure if the deviation between the predefined value and the measured value exceeds a preset threshold. Similarly, the first processor 80 may compare the measured output shaft position of the transmission 40 with a predefined output shaft position of the transmission 40 to determine whether there is a joint failure. For example, when the deviation of the two exceeds a threshold, it can be determined that there is a joint failure. In another implementation, the measured position of the rotor of the motor 20 and the measured position of the output shaft of the transmission 40 are compared to correspond predefined values respectively, and a joint failure may be determined when one of deviations exceeds a corresponding preset threshold. In yet another specific implementation, the first processor 80 may compare the measured rotor position of the motor 20 with the measured output shaft position of the transmission 40 to determine whether there is a joint failure. For example, taking the gear ratio of the transmission 40 into account, when a deviation between the measured rotor position of the motor 20 and the measured output shaft position of the transmission 40 exceeds a threshold, it is determined that there is a joint failure.

It can be understood that the foregoing various calculations and/or comparisons may also be completed by the second processor 81, or by the first processor 80 and the second processor 81 respectively. Specifically, in an embodiment, both the first processor 80 and the second processor 81 are simultaneously coupled to the position sensors 60a, 60b to receive signals from the same. As needed, the above computation can be performed by either the first processor 80 or the second processor 81. Alternatively, the first processor 80 and the second processor 81 may perform a part of the computation separately. For example, the first processor 80 performs a determination on joint failure based on the signals of the position sensor 60a, while the second processor 81 performs another determination on joint failure based on the signals of the position sensor 60b. Alternatively, both the first processor 80 and the second processor 81 may be utilized to perform the complete computation separately, and when either processor determines that a joint fault exists, a safety measure can be initiated.

In another embodiment, at least one of the first processor 80 and the second processor 81 is configured to calculate a rotational speed of the rotor based on the measured position of the rotor and a rotational speed of the output shaft of the transmission 40 based on the measured position of the output shaft, and determine whether there is a joint failure based on a deviation of the rotational speeds of the rotor and the output shaft.

For example, the first processor 80 obtains the measured rotor position of the motor 20 and the measured output shaft position of the transmission 40 by receiving signals from the sensors 60a, 60b, respectively, calculates the rotor speed of the motor 20 based on the measured rotor position of the motor 20, and calculates the rotational speed of the output shaft of the transmission 40 based on the measured output shaft position of the transmission 40. Specifically, the rotor position of the motor 20 is sampled twice at a certain time interval, so as to provided two position values for calculating the rotor speed of the motor 20. Similarly, the rotational speed of the output shaft of the transmission 40 can be calculated according to the position of the output shaft of the transmission 40 which are also sampled twice at a certain time interval. In an exemplary implementation, by taking the gear ratio of the transmission 40 into account, the first processor 80 compares the calculated rotor speed of the motor 20 with the calculated output shaft speed of the transmission 40, and when the deviation exceeds a threshold, it can be determined that there is a joint failure. In another exemplary implementation, the first processor 80 compares the calculated rotor speed of the motor 20 with a predefined rotor speed of the motor 20 to determine whether there is a joint failure. For example, when the deviation of the two exceeds a threshold, it can be determined that there is a joint failure. Similarly, the first processor 80 may compare the calculated output shaft rotational speed of the transmission 40 with a predefined output shaft rotational speed of the transmission 40 to determine whether there is a joint failure. For example, when the deviation of the two exceeds a threshold, it can be determined that there is a joint failure.

It can also be understood that the foregoing various calculations and/or comparisons may also be completed by the second processor 81, or by the first processor 80 and the second processor 81 collectively or respectively.

According to embodiments of the present application, the sensor data is collected locally by the first processor 80 and/or the second processor 81, so that the sampling frequency is high, the time interval between the two samplings is short, and therefore the calculated rotor speed of the motor 20 and the calculated rotational speed of the output shaft of the transmission 40 are more accurate.

Figure 3:
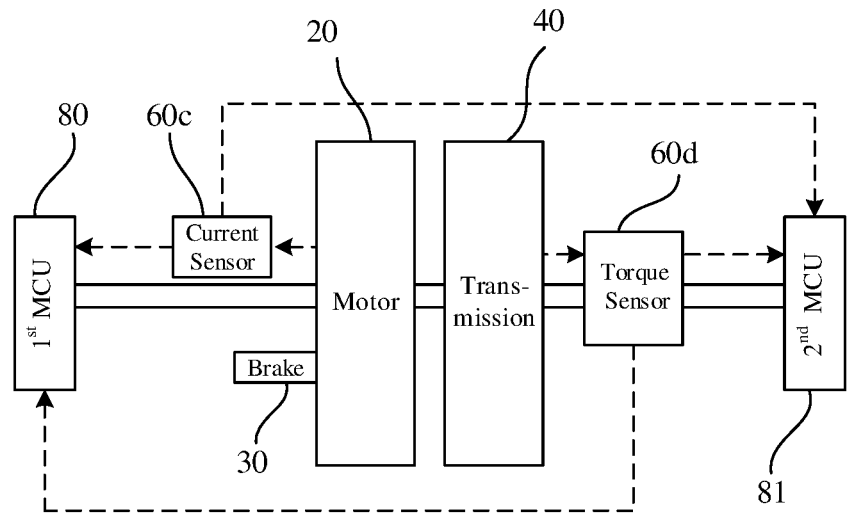
FIG. 3 is a schematic diagram of a structure of a joint assembly according to another embodiment of the present disclosure.

Referring to FIG. 3, in an embodiment, the at least one set of sensors include a current sensor 60*c* configured to measure a current of the motor 20 and a torque sensor 60*d* configured to measure a torque output by the transmission 40 coupled to motor 20. At least one of the first processor 80 and the second processor 81 is configured to determine whether there is a joint failure based on the measured current and the measured torque.

For example, the first processor 80 obtains the measured current of the motor 20 from the signal of current sensor 60*c* and the measured torque of the transmission 40 from the signal of the torque sensor 60*d*, and calculates an estimated torque based on the measured current of the motor 20. Taking the gear ratio of the transmission 40 into account, the first processor 80 further compares the calculated estimated torque of the motor 20 with the measured torque of the transmission 40, and if the deviation between the two exceeds a threshold, it is determined that there is a joint failure.

In addition, the first processor 80 may also compare at least one of the calculated estimated torque of the motor 20 and the measured torque of the transmission 40 with a corresponding preset torque to determine whether there is a joint failure.

It can also be understood that the above calculation and/or comparison may be completed by the second processor 81, or by the first processor 80 and the second processor 81 respectively. Specifically, in an embodiment, both the first processor 80 and the second processor 81 are simultaneously coupled to the current sensor 60*c* and the torque sensor 60*d* to receive signals from the same. As needed, the above computation can be performed by either the first processor 80 or the second processor 81. Alternatively, both the first processor 80 and the second processor 81 may be utilized to perform the above complete computation separately, and when either processor determines that a joint fault exists, a safety measure can be initiated.

In an embodiment, one of the first processor 80 and the second processor 81 calculates the estimated torque of the motor 20 based on the current of the motor 20, and the other of the first processor 80 and the second processor 81 obtains the measured torque of the transmission 40 from the signal of the torque sensor 60*d*. The first processor 80 and the second processor 81 may determine whether there is a joint failure respectively by comparing the calculated estimated torque and the measured torque to corresponding thresholds as described above, or by comparing the calculated estimated torque of the motor 20 with the measured torque of the transmission 40.

Figure 4:
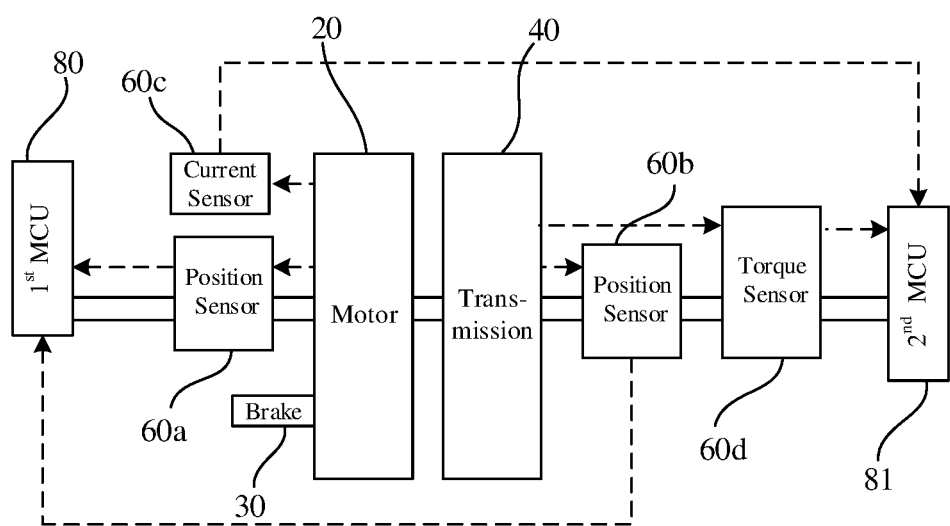
FIG. 4 is a schematic diagram of a structure of a joint assembly according to another embodiment of the present disclosure.

Referring to FIG. 4, in an embodiment, the at least one set of sensors 60 includes an input-side position sensor 60*a* configured to measure a position of a rotor of the motor 20, an output-side position sensor 60*b* configured to measure a position of an output shaft of the transmission 40, a current sensor 60*c* configured to measure a current of the motor 20, and a torque sensor 60*d* configured to measure a torque output by the transmission 40. One of the first processor 80 and the second processor 81 is configured to determine, for example, by the method as described above, whether there is a joint failure based on the measured position of the rotor of the motor 20 and the measured position of the output shaft of the transmission 40, and the other of the first processor 80 and the second processor 81 is configured to, determine, for example, by the method as described above, whether there is a joint failure based on the measured current of the rotor of the motor 20 and the measured torque of the output shaft of the transmission 40.

In one embodiment, the first processor 80 and the second processor 81 communicate with each other, and when one of the processors detects a joint failure, it sends notification information to the other processor, which also enables cross-check of the two processors 80, 81. In addition, by allowing the first processor 80 and the second processor 81 to communicate with each other, one processor may access sensor data from the other, which is more efficient than collecting all data directly from the sensors.

In one embodiment, the first processor 80 and the second processor 81 are implemented with different models, which reduces the probability that the two processors fail at the same time, and allows the two processors to mutually verify to identify a processor failure.

When it is determined that there is a joint failure, the first processor 80 and/or the second processor 81 sends a stop signal to the driving circuit 70, and the driving circuit 70 cuts off the torque output based on the stop signal, for example, by cutting off the current of the motor 20, or by engaging the brake 30 to stop the motor 20, thereby locking the joint assembly 10.

Figure 5:
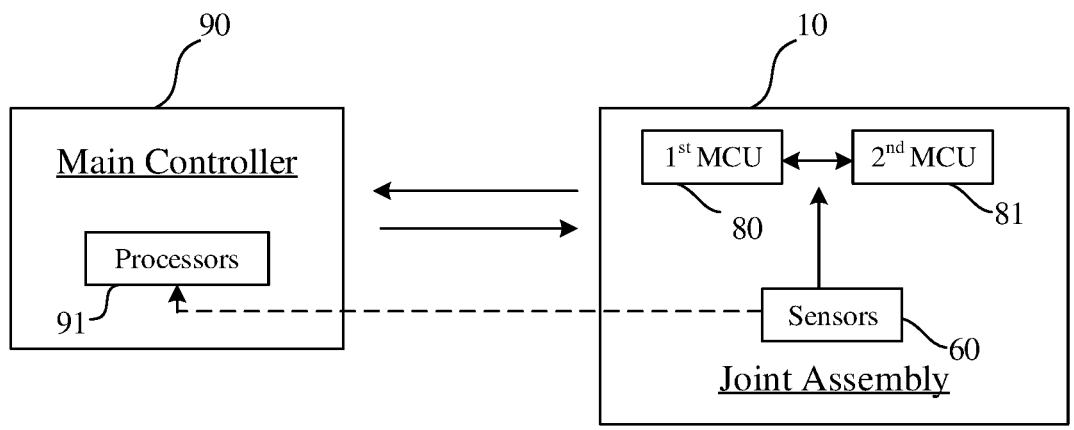
FIG. 5 is a block diagram showing communication between a main controller and a joint assembly according to an embodiment of the present disclosure.

In one embodiment, referring to FIG. 5, the safety system further includes a main controller 90. The main controller 90 communicates with the first processor 80 and the second processor 81, and generates a stop command for the entire device using the joint assembly 10 when receiving a joint failure notification from the first processor 80 and/or the second processor 81. For example, in response to the joint failure notification, the main controller 90 locks down all other joint assemblies of a robot. The main controller 90 may further include at least one processor 91, for example, a MCU which is configured to receive signals of the sensors 60 within the joint assembly 10 and perform various calculations and/or determinations as described above independently from the calculations or determinations performed by the first processor 80 and the second processor 81 within the joint assembly 10. Consequently, the determination of a joint failure can be further confirmed by the related computation in the main controller, so that the safety check reliability is improved. In an embodiment, the main controller has direct control over a main power switch, and when the main controller determines by itself that there's a fault in the system based on the data collected from the sensors in the joint assemblies and/or in other places of the system, the main controller will turn off the main power switch to lock down the whole device.

Figure 6:
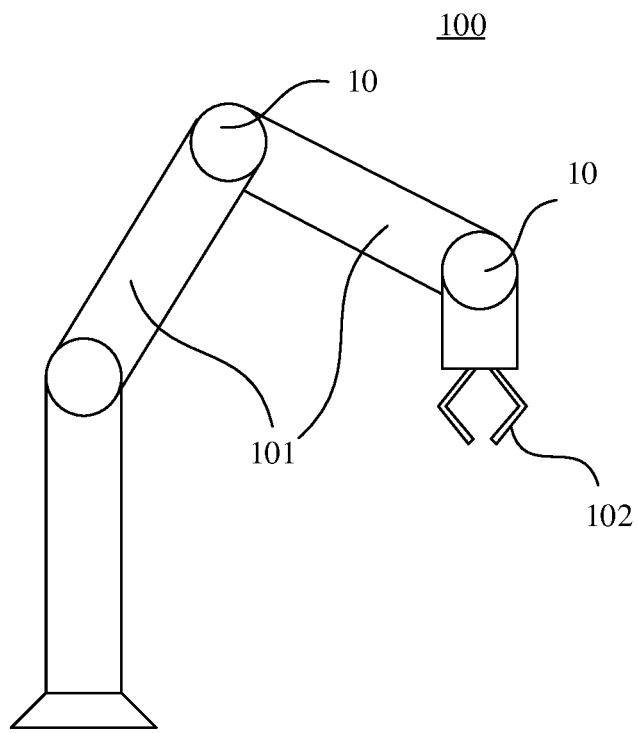
FIG. 6 is a schematic diagram of a structure of a robot according to an embodiment of the present disclosure.

According to other aspects of the present disclosure, a joint assembly with a safety assembly as described in the above various embodiments, and a robot having the joint assembly are provided respectively. Referring to FIG. 6, in an embodiment, the robot 100 includes at least two links 101 connected to each other through a joint assembly 10 that enables the links 101 to be able to rotate so as to adjust the position of an end effector 102 such as a gripper at the end of the connected links. In a further embodiment, at least two joint assemblies are provided. Each joint assembly 10 includes a pair of processors and at least one set of sensors as previously described, and all the joint assemblies 10 are coupled to and communicate with a common main controller. In this case, the processors of the main controller receive signals of the sensors within at least one, preferably all the joint assemblies 10 simultaneously and perform various calculations and/or determinations as described above to provides an extra check for function failure for each joint assembly 10.

According to some embodiments of the present disclosure, with two processors located within the joint assembly, safety functions on joint position limit, joint speed limit, or joint torque limit are at least done locally in the joint assembly, instead of completely relying on a main controller to do all the calculation and check. Compared to the communication between a main controller and sensors within the joint assembly, the communication between the sensors and the local processors can be faster because of, for example, a quick communication protocol, which thus eliminates or reduces the risk of communication failure. In addition, the joint assembly can safely lock down itself immediately when it detects a violation in any of the safety functions on joint position, speed or torque. The delay of failure detection and reaction can be much faster, compared to existing joint assemblies.

According to some embodiments of the present disclosure, with two processors located within the joint assembly, the computation load for the safety checks is then distributed to the joint assemblies of the robot, instead of crowded into a main controller with at least one processor. This burden sharing enables a shorter check interval and thus faster failure detection, and the checks in joint assemblies also add an extra layer of safety protection, in addition to the main controller. Moreover, according to some embodiment, because the joint speed is calculated locally in the joint, the time interval between two sampled joint position data points for calculating the joint speed is much smaller, compared to existing joint assemblies. Therefore, a much more accurate joint speed is used for safety check, which will improve the check accuracy and confidence of all safety functions that rely on joint speed data.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "includes" when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A safety system of a joint assembly, the joint assembly including a motor and a brake coupled to the motor, the safety system comprising:
    at least one set of sensors configured to detect at least one parameter associated with safety function of the joint assembly;
    a driving circuit coupled to the motor and the brake and arranged within the joint assembly; and
    a first processor and a second processor arranged within the joint assembly, and configured to receive a signal indicative of the at least one parameter from the at least one set of sensors and send a stop command directly to the driving circuit to stop the motor in response to a joint fault determined based on the signal received from the at least one set of sensors;
    wherein the first processor and the second processor are configured to communicate with each other, and send a notification to each other when determining there is a joint failure.

2. The safety system of claim 1, wherein the at least one set of sensors comprise an input-side position sensor configured to measure a position of a rotor of the motor and an output-side position sensor configured to measure a position of an output shaft of a transmission coupled to the motor, and at least one of the first processor and the second processor is configured to determine whether there is a joint failure based on the measured position of the rotor and the measured position of the output shaft of the transmission.

3. The safety system of claim 2, wherein the at least one of the first processor or the second processor is configured to compare the measured position of the rotor with the measured position of the output shaft to determine whether there is a joint failure based on a deviation therebetween.

4. The safety system of claim 2, wherein the at least one of the first processor or the second processor is configured to compare at least one of the measured position of the rotor and the measured position of the output shaft with a corresponding predefined position to determine whether there is a joint failure.

5. The safety system of claim 2, wherein at least one of the first processor or the second processor is configured to calculate a rotational speed of the rotor based on the measured position of the rotor and a rotational speed of the output shaft based on the measured position of the output shaft, and determine whether there is a joint failure based on a deviation of the rotational speeds of the rotor and the output shaft.

6. The safety system of claim 2, wherein at least one of the first processor or the second processor is configured to calculate a rotational speed of the rotor based on the measured position of the rotor and a rotational speed of the output shaft based on the measured position of the output shaft, and compare at least one of the calculated rotational speeds of the rotor and the output shaft with a corresponding predefined speed to determine whether there is a joint failure.

7. The safety system of claim 1, wherein the at least one set of sensors comprise a current sensor configured to measure a current of the motor and a torque sensor configured to measure a torque output by a transmission coupled to motor, and at least one of the first processor and the second processor is configured to determine whether there is a joint failure based on the measured current and the measured torque.

8. The safety system of claim 7, wherein the at least one of the first processor or the second processor is configured to calculate an estimate torque of the motor based on the current, and compare the calculated estimate torque of the motor with the measured torque of the transmission to determine whether there is a joint failure based on a deviation therebetween.

9. The safety system of claim 7, wherein the at least one of the first processor or the second processor is configured to calculate an estimated torque based on the current, and compare at least one of the calculated estimated torque of the motor and the measured torque of the transmission with a corresponding predefined torque to determine whether there is a joint failure.

10. The safety system of claim 7, wherein the first processor is configured to calculate an estimated torque based on the current and determine whether there is a joint failure based on the calculated torque of the motor, and the second processor is configured to determine whether there is a joint failure based on the measured torque of the transmission.

11. The safety system of claim 7, wherein the first processor is configured to calculate an estimated torque of the motor based on the current, and the second processor is configured to acquire the measured torque of the transmission from the torque sensor, the calculated estimated torque being compared with the measured torque to determine whether there is a joint failure.

12. The safety system of claim 1, wherein the at least one set of sensors comprise:
an input-side position sensor configured to measure a position of a rotor of the motor;
an output-side position sensor configured to measure a position of an output shaft of a transmission coupled to the motor;
a current sensor configured to measure a current of the motor; and
a torque sensor configured to measure a torque output by the transmission,
wherein one of the first processor and the second processor is configured to determine whether there is a joint failure based on the measured position of the rotor of the motor and the measured position of the output shaft of the transmission, and the other of the first processor and the second processor is configured to determine whether there is a joint failure based on the measured current of the motor and the measured torque of the transmission.

13. The safety system of claim 1, wherein the first processor and the second processor are implemented with different technical specifications.

14. The safety system of claim 1, wherein the first processor and the second processor are configured to lock down the joint assembly by cutting the torque output or engaging the brake of the joint assembly.

15. The safety system of claim 1, further comprising a main controller configured to communicate with the first processor and the second processor and generate a lock down command for a device using the joint assembly in case of receiving a joint failure notification from any of the first processor and the second processor.

16. A joint assembly, comprising:
a motor;
a brake coupled to the motor; and
a safety system, wherein the safety system includes:
at least one set of sensors configured to detect at least one parameter associated with safety function of the joint assembly;
a driving circuit coupled to the motor and the brake and arranged within the joint assembly; and
a first processor and a second processor arranged within the joint assembly, and configured to receive a signal indicative of the at least one parameter from the at least one set of sensors and send a stop command directly to the driving circuit to stop the motor in response to a joint fault determined based on the signal received from the at least one set of sensors;
wherein the first processor and the second processor are configured to communicate with each other, and send a notification to each other when determining there is a joint failure.

17. A robot, comprising:
at least one joint assembly, the at least one joint assembly including a motor, a brake coupled to the motor and a safety system, wherein the safety system includes:
at least one set of sensors configured to detect at least one parameter associated with safety function of the joint assembly;
a driving circuit coupled to the motor and the brake and arranged within the joint assembly; and
a first processor and a second processor arranged within the joint assembly, and configured to receive a signal indicative of the at least one parameter from the at least one set of sensors and send a stop command directly to the driving circuit to stop the motor in response to a joint fault determined based on the signal received from the at least one set of sensors;
wherein the first processor and the second processor are configured to communicate with each other, and send a notification to each other when determining there is a joint failure.

18. The robot of claim 17, wherein the at least one joint assembly comprises at least two joint assemblies each communicating with a common main controller respectively.

19. The robot of claim18, wherein the main controller comprises at least one processor configured to receive signals of at least one set of sensors within at least one of the jointly assemblies, determine whether there is a joint failure based on the received signals, and lock down the robot in response to the joint failure.

* * * * *